United States Patent [19]

Sepulveda-Garese et al.

[11] Patent Number: 5,430,730
[45] Date of Patent: Jul. 4, 1995

[54] METHOD FOR BUILDING A SUB-NETWORK IN A DISTRIBUTED VOICE MESSAGING SYSTEM

[75] Inventors: Reinaldo L. Sepulveda-Garese, Union City; Irene Preysman, Sunnyvale; Narinder Jain, Campbell, all of Calif.

[73] Assignee: Rolm Company, Santa Clara, Calif.

[21] Appl. No.: 120,985

[22] Filed: Sep. 14, 1993

[51] Int. Cl.⁶ .............................................. H04J 3/24
[52] U.S. Cl. ................................................ 370/94.3
[58] Field of Search .................... 370/94.1, 94.3, 85.13, 370/100.1, 85.1, 60, 85.8, 85.2, 85.3; 340/825.01, 825.02, 825.08

[56] References Cited

U.S. PATENT DOCUMENTS

| | | | |
|---|---|---|---|
| 5,018,133 | 5/1991 | Tsukakoshi et al. | 370/94.3 |
| 5,130,980 | 7/1992 | Heffner, III | 370/94.3 |
| 5,297,138 | 3/1994 | Black | 370/94.3 |

*Primary Examiner*—Douglas W. Olms
*Assistant Examiner*—Dang Ton
*Attorney, Agent, or Firm*—Michael B. Einschlag

[57] ABSTRACT

Method for building a sub-network for a distributed Voice Messaging System that can be initiated from any of the nodes in the sub-network. For the distributed application to work, all the nodes in the network being created must be identified, numbered, and a map of the network distributed to all Voice Messaging System nodes. Advantageously, the inventive method enables logically independent sub-networks of Voice Messaging Systems to co-exist in the same physical LAN. An embodiment of the present invention is a method for building a sub-network of nodes in a communication network, the method including the steps of: (a) identifying nodes to be included in the sub-network; (b) gathering node configuration information from the nodes identified; (c) resolving node configuration information conflicts among the nodes in the sub-network; (d) create a subnetwork map; (e) distributing the sub-network map to the nodes in the sub-network; and (f) synchronizing the nodes in the sub-network.

20 Claims, 3 Drawing Sheets

METHOD FOR BUILDING A SUB-NETWORK IN A DISTRIBUTED VOICE MESSAGING SYSTEM

TECHNICAL FIELD OF THE INVENTION

The present invention relates to a method of building a sub-network in a distributed Voice Messaging System (VMS) connected by a Local Area Network (LAN) and dynamically synchronizing all the nodes of the VMS.

Background of the Invention

Distributed Voice Messaging System (VMS) networks in the art have existed on Local Area Networks (LANs). However, in such implementations, the entire LAN has been devoted to the VMS network. This is inefficient, for example, because it requires a company to purchase and maintain several LANs in order to provide connectivity for a computer network as well as for a VMS network. Further, this approach inhibits possible connectivity between the two or more types of networks.

In light of this, there is a need in the art for sub-networks of voice messaging systems which comprises a portion of a communications network such as a LAN. In addition, there is a need in the art for one or more of such sub-networks to co-exist on the same communications network. In further addition, there is a need in the art for a method for building such sub-networks of distributed voice messaging systems on a LAN

SUMMARY OF THE INVENTION

Advantageously, embodiments of the present invention provide a method for building sub-networks of distributed Voice Messaging Systems (VMSs) on a communications network such as a Local Area Network (LAN).

For a distributed, sub-network of VMSs to operate properly, all Voice Messaging (VM) nodes in the sub-network must be configured with a sub-network map. The sub-network map is a data structure that contains information relating to all VM nodes that belong to the sub-network. The minimum information that must be contained in the sub-network map (one entry for each node in the sub-network is included in the subnetwork map) is: (a) a node number for each node in the sub-network (a node number is a unique identifier for a node in a sub-network); (b) a group name (a group name is an identifier of one or more nodes in a LAN network); (c) a Local Area Network Identifier (a LAN-ID is an identifier of a sub-network); and (d) a physical address of a LAN Adapter Card for each node (this is a unique identifier of each LAN adapter card in the VMS which is read from the adapter card).

The building process of a sub-network includes: (a) identifying all nodes that belong to the sub-network; (b) gathering configuration information from all these nodes; (c) assigning a new node number to the nodes, if required, and (d) distributing the sub-network map to all the nodes. Only after the new sub-network map is created, distributed, and acknowledged by all nodes in the sub-network can the distributed VMS operate properly.

While building the sub-network one must take care of concurrency and synchronization of other applications or utilities that may be executing in any or all of the VMS nodes in the sub-network being built. For example, if two nodes start the building process at the same time, collisions can occur and the process could fail. Safeguards must be included in the building process to guarantee a successful sub-network build or to clearly identify problems.

An embodiment of the present invention is a method for building a subnetwork of nodes in a communication network, the method comprising the steps of: (a) identifying nodes to be included in the sub-network; (b) gathering node configuration information from the nodes identified; (c) resolving node configuration information conflicts among the nodes in the sub-network; (d) create a sub-network map; (e) distributing the subnetwork map to the nodes in the sub-network; and (f) synchronizing the nodes in the subnetwork.

DETAILED DESCRIPTION

Figure 1:
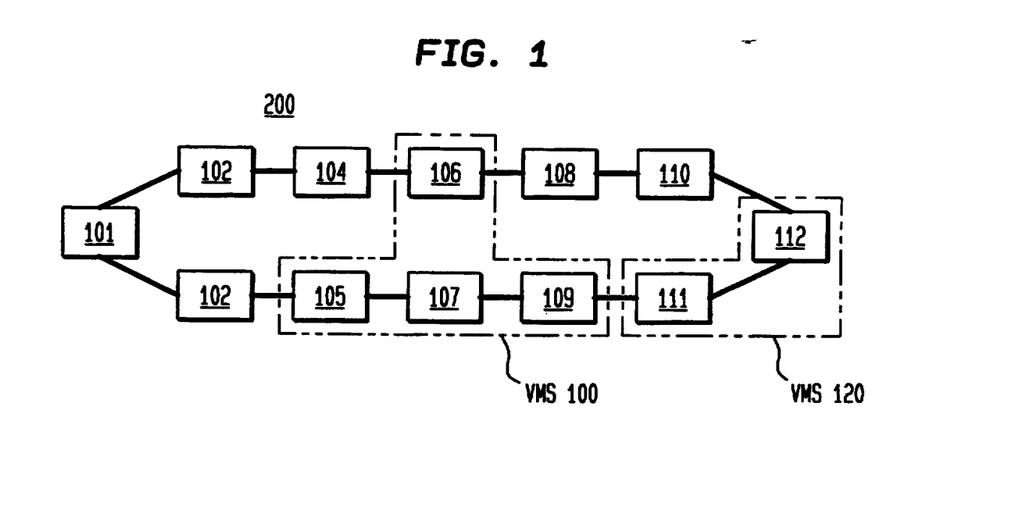
FIG. 1 shows a block diagram of nodes which are connected in a Local Area Network.

FIG. 1 shows a block diagram of nodes 101-112 which are connected in a Local Area Network 200 (LAN 200). Some of the nodes could be computers and some of the nodes could be voice messaging systems. If all the nodes connected to LAN 200 are Voice Messaging (VM) nodes that are to be included in a distributed Voice Messaging System (VMS) network, then we refer to the inventive method as building a network. However, if only some of the nodes connected to LAN 200 are to be included as part of the distributed VMS, then we refer to the inventive method as building a sub-network. As further shown in FIG. 1, VMS sub-network 100 is comprised of VM 105-107 and 109 and VMS sub-network 120 is comprised of VM 111-112. As those of ordinary skill in the art will readily appreciate, the case of building a sub-network in a distributed Voice Messaging System encompasses the case of building a network.

Although there are several ways of specifying which nodes are to be included in the sub-network, a node selection technique using a Group Name will be described. In accordance with this preferred embodiment of the inventive method, only VM nodes connected to LAN 200 having the same Group Name will be included in the sub-network.

All nodes are considered equal in a fully distributed VMS. However, in accordance with the inventive method, once the building process starts, a node that initiates the building process is considered to be a master node as far as the building process is concerned. Despite this, by having all nodes equal, the building process can be initiated from any of the nodes in the VMS and by specifying a master node once the process starts, the master node can easily control the complete process and decide on actions to take if an error condition occurs.

For a distributed Voice Messaging Application to operate properly, all nodes in the VMS must have a unique node number. If there are one or more duplicate node numbers, they need to be resolved to successfully build a sub-network. In accordance with the inventive method, to resolve node numbering conflicts, a manual or automatic building mode can be specified by a user at the beginning of the building process. In the manual build mode, the user resolves the duplicate node number conflict by changing the node number of the nodes that are in conflict. In the automatic build mode, a utility which will be described below resolves the duplicate node number conflict by changing the node number of the nodes that are in conflict. For a process description of the automatic build mode please see Appendix A.

Figure 2:
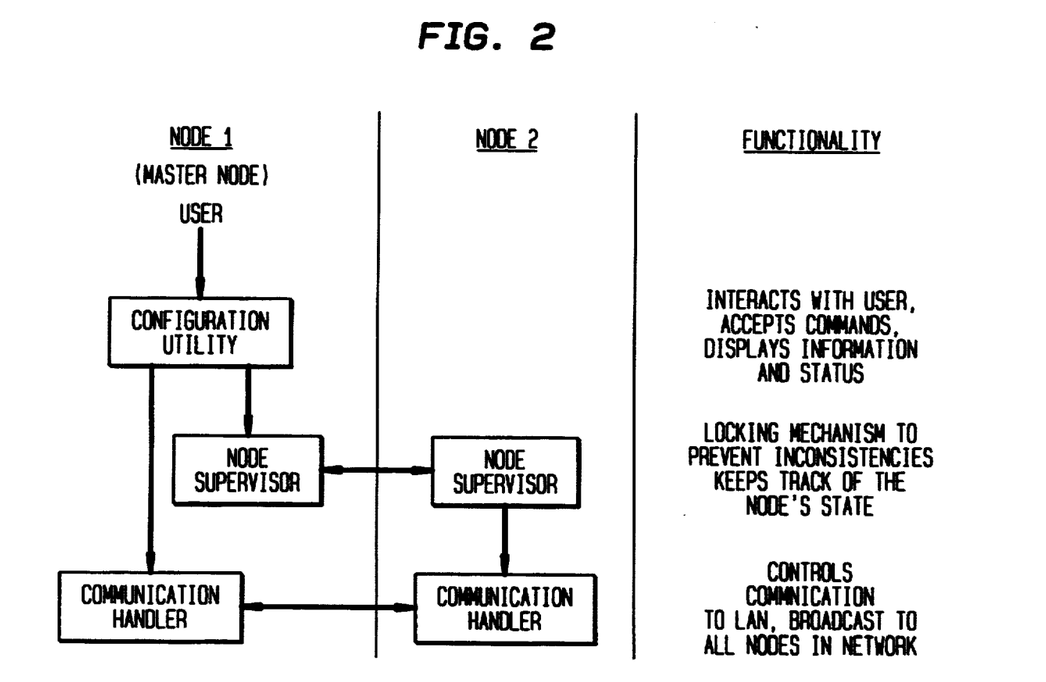
FIG. 2 shows a block diagram of the software modules that embody the inventive method and their architecture with respect to nodes in the network.

FIG. 2 shows a block diagram of software modules that embody the inventive method and their architecture with respect to nodes in the network. As shown in FIG. 2, the software modules that embody the building process are formulated in a layered architecture, as in the well known ISO-OSI Network Architecture model, with some modifications. Each layer implements a specific functionality with the lower layers, offering services to the layers above. However, the preferred embodiment of the present invention extends the ISO-OSI Network Architecture model in that a higher layer can directly request services from any layer below and is not restricted to receiving services from a layer immediately below it. As shown in FIG. 2, the three layers involved in embodying the inventive method, starting from the top, are:

(a) The Configuration Utility (Config. Util.) is software that runs in an Application Layer that interacts with the user and that may request user input or confirmation. The Config. Util. initiates and sequences the building process. It makes sure that all the VM nodes requested by the user are included in the sub-network and it displays status information related to the building process.

(b) Node Supervisor (NS) Layer contains software that offers services to the Application Layer. These services include: (i) keeping track of all utilities being executed in the Application Layer at a VM node; (ii) keeping track of which applications are active in the Application Layer at the VM node (referred to as the state of the VM node); and (iii) locking or excluding a utility from executing if the utility conflicts with the current state of the VM node. Each utility has an attribute list attached thereto which specifies: (i) the system state under which it is allowed to execute and (ii) the identity of other utilities with which it can execute simultaneously. The software at the NS layer also has the capability of modifying a node's configuration parameters with the sub-network map.

(c) Communication Handler (CH) Layer contains software that offers services to software in the Application Layer and the NS Layer. The software in the CH controls and establishes communication between all nodes in the subnetwork. The software has the capability of sending and receiving messages from any node, and it can also send broadcast messages to all nodes physically connected to the LAN. It knows the configuration parameter values for its own node, and can respond with them when queried from another node. Once a sub-network is configured, this module's function is to synchronize and create a communication channel with all other VM nodes in the sub-network.

The goals of the building process are: (a) to have a simple design; (b) to minimize communication among nodes; (c) to have one layer in a VM node communicate with the same layer in a different node; (d) to have a robust process that always succeeds, or if any inconsistency is detected, terminates with clear and meaningful messages to the user; (e) to allow initiating the building process from any of the nodes in the sub-network being built; (f) to avoid the existence of redundant information in the building process, and (g) to allow for a secure process (if desired).

The steps described below are carried out by software which executes on the computers at the VM nodes in the LAN.

When a voice messaging node is created, default values are assigned to Group Name, node number, and LAN-ID. In the preferred embodiment, these values are "VMS" for Group Name, 1 for node number, and 0 for LAN-ID.

The detailed description of each step required to build a sub-network follows. The preferred embodiment of the inventive method requires a user to, at least, configure each VM node to have a Group Name (otherwise the default value is used). It also requires that each VM node have a LAN Adapter Card with a physical address that is unique, and that each VM node knows its own physical address. The following are the steps of the inventive method:

1. (User—>Config Util.): A user executes the Config. Util. at a node to build a sub-network, and specifies the Group Name of all VM nodes that are to be included. Thus, in this embodiment, Group Names are used to identify nodes to be included in sub-networks. The user chooses either a Manual or an Automatic node numbering mode. For a description of the Automatic node numbering mode, please refer to Appendix A. The node at which the building method starts is considered the master node.

2. (Config Util.—>CH): Then, the Config. Util. requests the CH to gather network map information from all nodes in the network that have the same Group Names as those specified by the user.

3. (CH—master node): Then, the CH at the master node sends a broadcast message over the LAN requesting all VM nodes in the LAN with the Group Names specified by the user to respond with their configuration information (Node Number, Group Name, LAN-ID and LAN adapter card physical address).

4. (CH—all nodes): All VM nodes in the LAN receive the broadcast message (including the master node) and check the request. Only if a VM node belongs to the Group Names that were specified in the broadcast will it respond to the master node with its configuration information.

5. (CH—master node): The master node waits for t1 sec, enough time to guarantee that all nodes in the LAN have time to process the request and respond to it. The master node then processes all the responses and it returns the network map of all the responding nodes to the Config. Util. The time-out of t1 is system dependent, and for one particular application a value of 10 sec was used.

6. (Config Util): The Config. Util., interacting with the user, is responsible for the network map validation and conflict resolution. Validation of the network map implies checking the maximum number of nodes in the sub-network. If the user selected an Automatic build mode, then any node number conflict will be automatically solved by the utility (refer to Appendix A for a description). If the Manual build mode was selected, the Config. Util. would display all the duplicate node numbers and the user would change the configuration of the conflictive nodes and restart the building process. Once all conflicts are resolved, the user will confirm and the building process will proceed. The Config. Util. generates a new unique LAN-ID to identify a new sub-network. In the preferred embodiment, this is done by combining the master node's LAN Adapter Card physical address with a time stamp. One can readily see that the LAN-ID is utilized to address nodes in the sub-network. Thus, while it is possible for a a node which is added to the network later to have the same Group Name as previous nodes, it will not be placed on the same sub-network without a further building process since its LAN-ID will be different.

7. (Config Util.—>NS): Config. Util. requests NS to proceed with the building process. Config. Util. passes a new network map with a LAN-ID, physical LAN addresses and node numbers to NS at the master node.

8. (NS—master node): NS proceeds with a two way commit protocol. First, it sends requests to NS(s) on all nodes in the sub-network to execute a lock to insure a successful build. A lock should guarantee that no other utility affecting the build process can be executed. The lock also insures that voice messaging applications remain inactive during the building process.

9. (NS—all nodes): When an NS at a node receives the request, it attempts to execute the lock and replies to the master node NS with status and error information where appropriate. Status information could be positive (an acknowledgment of a successful lock) or negative (rejection of the lock).

10. (NS—master node): NS at the master node times out on a wait if not all replies are received within 12 sec. No reply from a node is equivalent to a negative reply. In the preferred embodiment, one negative reply terminates the entire building process. An example of an error condition is a failed lock due to a conflict with a concurrent network building process being performed on another node. Error information is used by Config. Util. to provide feedback to the user. If the building process is terminated, NS at the master node sends unlock requests to all the sub-network nodes to cancel the lock. To guarantee that a node does not remain locked in case of failures during the building process (such failures being caused, for example, by the master node going down or by losing connection), NS at each node implements a lock-time-out mechanism. In accordance with the lock time-out mechanism, an NS at a node will automatically unlock after 13 sec if no further requests are received from the master NS. Timers 12 and 13 are system dependent. For example, in an embodiment of the present invention, values of 10 sec and 30 sec were used respectively.

11. (NS—master node): If and only if a positive acknowledgment is received from all the nodes in the new sub-network map, the building process will continue. The next step is for master node's NS to send the new sub-network map to the NS of all the VM node in the sub-network.

12. (NS—all nodes): NS at each node receives the new network map, updates its network configuration information, executes-unlock, and replies to the master node that the building process was successful.

13. (NS—master node): The building process is considered successful if and only if the master node NS receives positive acknowledgments from all the nodes in the new sub-network. As in (step 10) NS on a master node times out if all nodes do not reply within 12 sec. Refer to step 10 for a recovery mechanism if a positive reply is not received within the specified time period.

14. (NS—>Config Util.): NS at a master node returns a build status and error information to the Config. Util. The Config. Util. then notifies the user of the build outcome. Build status (successful or not) and an error message, if applicable, are reported to the user. The user can, at this point, correct the problem(s) and attempt a new build.

15. (Config Util.—>CH): The Config. Util. notifies the CH to read the new network map. If the map read by the CH is different from the map it had, it will immediately send a request to all CHs in the sub-network to read the new network map. The CHs will then start the automatic synchronization process with all other nodes. No acknowledgment is required to be sent back to the master node. For a detailed description of the synchronization process, please refer to Appendix B. All nodes in the sub-network execute a background consistency check process that verifies that all nodes are synchronized. In the event that a node is not synchronized and does not accept the synchronization requests from other nodes, an error is logged and alarms go off.

The time that it takes to complete the sub-network building process depends mainly on the time-out values that are used. We have discovered that values of 10 and 30 sec were enough to guarantee response from all nodes in a particular VMS. However, as those of ordinary skill in the art readily appreciate, the time out values depend on the type of LAN and number of nodes connected.

As one of ordinary skill in the art can readily appreciate, having one node act as a master for the building process allows for centralized error reporting and synchronization of the operation in all nodes. For example, the execution of each step in the building process requires that all of the requirements of the previous steps must have been fulfilled by all nodes. Of course, the use of a master node does not preclude starting the building process from any node in the sub-network.

Even though the Voice Messaging System nodes to be included in the subnetwork were specified using the Group Name, the inventive building process allows for different ways of specifying the nodes in the sub-network. The particular way used in a particular building process can be selected by the user at build time. In accordance with the present invention, nodes are notified of the build type with a special coded value sent in the broadcast. Other types of node selection are:

(a) Each node can be assigned a specific node name, and nodes in the sub network can be selected by specifying the node names.

(b) Nodes can be specified by node numbers, as long as there are no conflicts.

Because computers can be deactivated, removed from the network, or can crash at any time, time-outs are used by all nodes to assure that if an acknowledgment or the next build command is not received, the building process is aborted and resources deallocated. Even though the recovery mechanisms can be made as sophisticated as desired, in some cases a simpler mechanism may be used to simplify the development effort.

If security is of importance and the environment is a non-cooperative one, mechanisms can be implemented in the building process to guarantee that once the build starts (i.e., a master node selected), no other node can take the place of the master node, and that once the network map is accepted (i.e. the nodes in the sub-network are selected) no node can be substituted:

The master node can fully identify itself in the initial broadcast and when nodes respond they can specifically address messages to the master node. Then, the master node will discard messages from any node not in the initial sub-network map.

All nodes that respond to the initial master node broadcast may also fully identify themselves. From this point on, the master node can send messages to individual nodes instead of using the broadcast mechanism. Individual nodes will discard messages from any node other than the master node.

As those of ordinary skill in the art will readily appreciate, the building process is independent of how closely coupled the VM nodes are. That is, the inventive process will work well with loosely or tightly coupled nodes.

Lastly, advantageously, in accordance with the present invention, the user is not required to provide network configuration parameters in any node before the building process starts. The only configuration parameters that are required to be set are those that are specific to the node, like the Group Name and Node number for a manual build. After a network is successfully built, it will automatically update all the nodes in the sub-network with the new network map.

Those skilled in the art will recognize that the foregoing description has been presented for the sake of illustration and description only. As such, it is not intended to be exhaustive or to limit the invention to the precise :form disclosed. For example, modifications and variations are possible in light of the above teaching which are considered to be within the spirit of the present invention. Thus, it is to be understood that the claims appended hereto are intended to cover all such modification and variations which fall within the true scope and spirit of the invention.

Appendix A

Automatic Node Number Assignment

An Automatic Node numbering process is described which assigns a unique node number to each node of a distributed Voice Messaging System application in a network. The node number is used by the VM nodes to uniquely identify a node. The criteria used for the automatic assignment is one that minimizes changes of node numbers for Voice Messaging Systems that already have a node number assigned.

Manual node number assignment requires an operator to go to each node and modify the node number configuration parameter to the one desired. When a user requires or desires to have each node in the network configured with a specific number, then the manual mode is the simplest way of accomplishing this. However, there are cases where the user may not require each VM node to have a specific node number. For such cases, or if the computers are not co-located or if the number of computers in the network is large, the user may select an automatic method of assigning node numbers. With this method, node numbers are assigned with no user intervention. This can potentially save a considerable amount of operator time, resulting in a node numbering plan that can be consistent with previous node number assignments.

A description of the algorithm follows:

1. The node that is executing the automatic node number assignment algorithm retains its node number, this is the master node.

2. All the nodes that were already in the same sub-network as the master node, if any, retain their node number. Note that this guarantees no duplicate node numbers up to this point. Also note that the process of building new sub-networks can cover the case of combining two existing sub-networks.

3. All node numbers that do not have a duplicated node number retain their node numbers. By duplicated we mean that no other node in the sub-network being built has the same node number.

4. For all the nodes that have a duplicate node number and that have not been assigned, a search is made for a non-assigned node number, starting from 1. Once a non-assigned number is found, it is assigned.

5. If a node with a specific node number is required, the highest node number that is not the same as the node number required is obtained and assigned as the required node number.

There are several variations that can be made to the above mentioned algorithm to satisfy different user requirements. For example:

1. If one requires that node numbers should be consecutive integers, once all the node numbers have been assigned, one starts filling gaps using some user defined criteria. For example, in one embodiment, one may start shitting all node numbers down (towards node number 1), retaining its order, or, grabbing from the last node and filling the lowest number gap.

2. If having gaps in the node numbering scheme is allowed, then for step 4 above, one starts assigning node numbers from numbers not already in use, starting from any arbitrary number "N".

3. If any specific node number "M" must exist (for example a node number 1 is required) and still does not exist, then get the highest, or lowest, node number and assign it as M.

Figure 3:
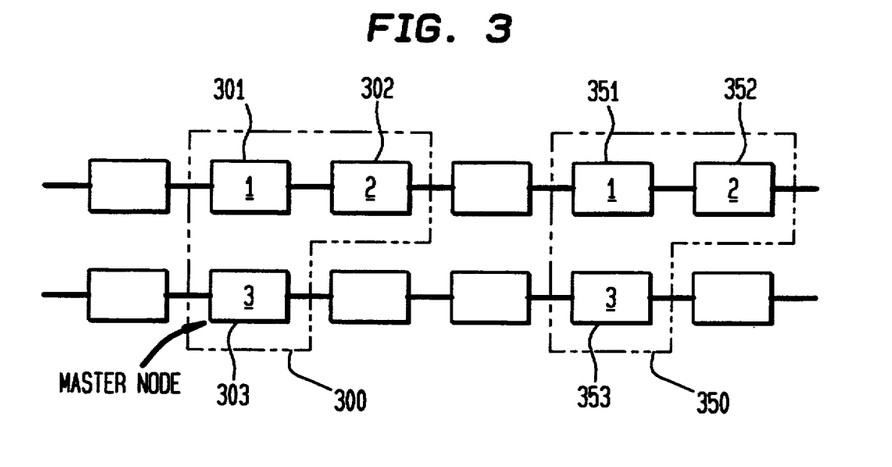
FIG. 3 shows a block diagram of a communication network comprised of two sub-networks of voice messaging systems.
Figure 4:
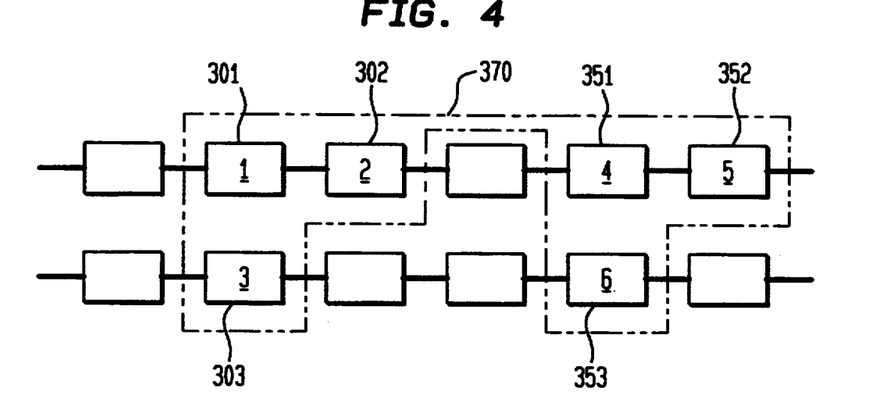
FIG. 4 shows a block diagram of a communications network wherein the two sub-networks of FIG. 3 have been combined into a single sub-network.

FIG. 3 shows a block diagram of a network comprised of two sub-networks, sub-network 300 (nodes 301–303) having node numbers 1, 2 and 3, respectively, and subnetwork 350 (nodes 351–353) having node numbers 1, 2 and 3, respectively. It is desired to combine sub-networks 300 and 350 into a single sub-network 370 shown in FIG. 4 and node 303 has been chosen as the master node for this building process. In accordance with the automatic node number assignment process described above, sub-network 370 shown in FIG. 4 comprises nodes 301–303 and 351–353 and the node numbers 1–6 have been assigned to nodes 301–303 and 351–353 as also shown in FIG. 4.

Appendix B

Dynamic synchronization of Voice Messaging Systems nodes in a sub-network

Synchronization is a mechanism by which configured nodes that come on-line let the already existing nodes in the sub-network become aware of their existence and their configuration, and inform them that they are ready for operation. Messages are exchanged between the node(s) already on-line and the node(s) coming on-line to perform a validation and security check. Only after a node coming-on line is validated and accepted as belonging to the sub-network, i.e. synchronized, a session establishment between that node and all others is attempted.

Figure 5:
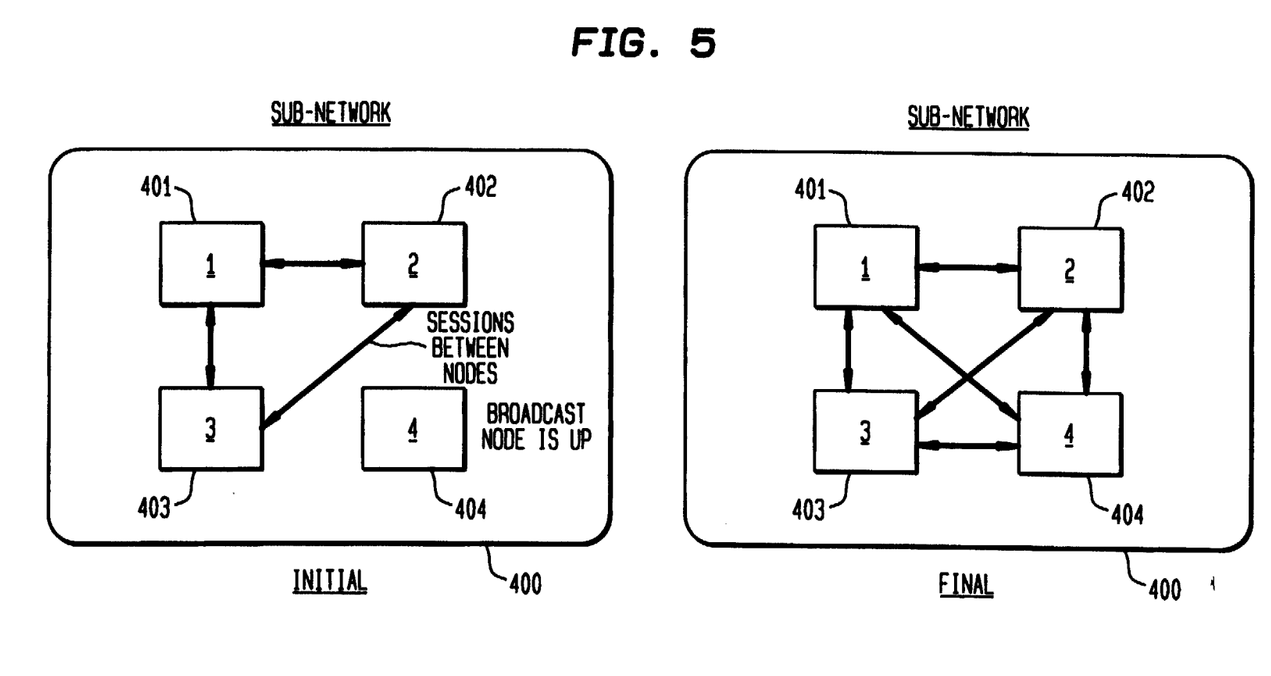
FIG. 5 shows a block diagram of an initial state of communications of a subnetwork wherein one node is not active and a block diagram of a final state of communications of the sub-network once the node is synchronized in accordance with the inventive method.

FIG. 5 shows a block diagram of an initial state of communications of subnetwork 400 comprised of nodes 401–404. In the initial state, node 404 is not active but is ready to be activated. Further, FIG. 5 shows a block diagram of a final state of communications of sub-network 400 once node 404 is synchronized in accordance with the method described below.

Nodes can become active or removed from the LAN at any time and they need to be synchronized with all other active nodes before the distributed Voice Messaging System application can become fully operational. Because each Voice Messaging System node is an independent computer, it can become on-line (active) or off-line (de-activate) at any time, in a non-scheduled way, thus a synchronization algorithm should be able to handle single or multiple activation/deactivation of nodes in a random fashion.

A process for dynamically synchronizing all configured nodes of a distributed Voice Messaging System sub-network is described.

For each Voice Messaging System node in a sub-network items such as node number and LAN Adapter card physical address will be different, and items such as the subnetwork unique identifier (LAN-ID) will be the same. Synchronization between the Voice Messaging Systems nodes in a sub-network is attempted under different conditions:

1. Immediately after the sub-network is built, so that the application can immediately start operating.

2. If a node becomes active after any type of failure (power failure, system crash, physically disconnecting a cable from the LAN, etc.).

The synchronization algorithm has no concept of master node or slave node, all nodes being considered equals. All nodes execute the same identical software algorithm for the synchronization process. The algorithm, which follows, uses the broadcast capability of the LAN:

1. When a node is activated, it will broadcast a message to the LAN-identifying itself with all its node specific and sub-network specific configuration information. The broadcast includes the purpose of the message (NODE-UP), node number, LAN-ID, and LAN adapter controller card physical address.

2. All currently connected nodes on the LAN will receive and validate the NODE-UP message. For example, nodes that belong to other sub-networks but are physically connected to the same LAN, will have a different LAN-ID and discard the message as not intended for them; nodes that belong to no sub-networks will also discard the message. When the broadcast is received by the node that sent it, it also is discarded.

3. For a node to accept the NODE-UP broadcast as valid, the following security checks must be passed:
  a. The LAN-II) received in the broadcast message must be identical to the node's own LAN-ID.
  b. The node number received in the broadcast must be one that belongs to the node's network map created while building the sub-network.
  c. There is consistency (no duplication) between the data received in the NODE-UP broadcast (node number, adapter controller card physical address), and the NODE-UP messages previously received from other Voice Messaging Systems that came on-line.

4. Nodes that do not accept the NODE-UP message will not respond to the broadcast.

5. Nodes that validate the NODE-UP broadcast message will perform two distinctive actions: (1) they will respond to it and (2) they will update their dynamic data structures. The information required in the dynamic data structures is the node number, LAN adapter card physical address, a flag specifying that the node is active, and the state of the synchronization process.
  a. The response to the NODE-UP message does not use a LAN broadcast. The adapter controller card address of the node that send the broadcast is part of the NODE-UP message, and is used as the response destination address. The response message type - NODE-UP-RESPONSE-will contain the same type of configuration information included in the NODE-UP message, this time from the responding Voice Messaging System.
  b. The node that received the NODE-UP message updates its internal data structures so that it now considers the remote node as active and ready for starting a session establishment procedure.

6. Every time the node that sent the NODE-UP broadcast receives a response to its message, a NODE-UP-RESPONSE, it will perform the same security validation as described on step 2 above. If the message passes the checks, the node will update its internal data structures so that it now considers the responding node as active and ready to start the session establishment procedure.

The above explained the synchronization algorithm when a node is activated. For the case when a node is de-activated, the following cases are addressed: a node deactivated (1) without informing the rest of the sub-network, and (2) informing the subnetwork.

1. If the node is suddenly removed from the network and is unable to notify all nodes on the sub-network, active nodes in the sub-network may get a notification from the LAN itself, or indirectly when the next time a message sent to the removed node is not acknowledged. In these cases, the active nodes should update their internal data structures to show that a node has been removed and all sessions to the removed node must be closed.

2. When a node is removed from the sub-network in an orderly fashion, for example, when a new node number or Group Name is assigned, it can then inform all other nodes of its removal. The remaining nodes, upon validation of the legitimacy of the message, will then close the sessions with the removed node and update their internal data structures without disrupting the sessions with the remaining nodes of the sub-network.

For robustness and to cover for cases where a broadcast message sent over the LAN fails to be delivered or processed by a node in the LAN, in accordance with the present invention, a background task (or a routine that gets executed periodically) can check if there are nodes configured but not currently synchronized. If such nodes exist, a NODE-UP broadcast can be sent to attempt synchronization. Note that it is not possible to send a message to that specific node, instead of a broadcast, because the address of the adapter controller card is not known. It could very well be that the node was taken out of service to replace a faulty LAN adapter card, in which case the new card will have a different address than the replaced card. Further in accordance with the present invention, configuration information used for security check validation may be sent encrypted.

Even though the description provided above was based on a LAN, the algorithm can work with any type of communication network. Along the same lines, a broadcast method of sending messages was used, but this is not imperative. The broadcast method was described because it is the most efficient way to send a message to all nodes. However, other methods of transmitting a message could be used as long as all nodes in the sub-network will receive it.

Lastly, to reduce traffic over the communication link, the only nodes that need to respond to a NODE-UP message are ones that provide a positive validation of the message.

What is claimed is:

1. A method for building a sub-network of nodes in a communications network, the method comprising the steps of:
   identifying nodes to be included in the sub-network;
   gathering node configuration information from the nodes identified;
   resolving node configuration information conflicts among the nodes in the subnetwork by eliminating duplicate node numbers among nodes to be included in said subnetwork;
   create a sub-network map;
   distributing the sub-network map to the nodes in the sub-network; and
   synchronizing the nodes in the sub-network.

2. The method of claim 1 wherein the step of identifying nodes comprises the step of choosing any node in the network at which the identification is to be made.

3. The method of claim 1 wherein the step of gathering node configuration information comprises the steps of:
   transmitting a broadcast message in the network;
   receiving the broadcast message; and
   transmitting node configuration information by the nodes identified.

4. The method of claim 1 wherein the step of identifying nodes comprises the step of identifying nodes by Group Name.

5. The method of claim 1 wherein the step of distributing the subnetwork map comprises transmitting the sub-network map to the nodes identified over the network.

6. The method of claim 1 wherein the step of synchronizing comprises the steps of:
   a node which is to be activated sending a broadcast message on the network identifying the sub-network;
   the nodes on the sub-network receiving the message; and
   the nodes on the sub-network transmitting node configuration information to the node to be activated.

7. The method of claim 1, wherein each new sub-network includes a unique LAN-ID, wherein said step of creating a new network map further includes the step of generating a new LAN-ID for said sub-network, said new LAN-ID comprising a LAN adapter card physical address combined with a time stamp.

8. A method for building a sub-network of nodes within a communications network architecture, said method comprising the steps of:
   providing a network of nodes, wherein each node in said network of nodes includes node configuration information of at least a group name, a node number, a LAN-ID and a LAN adapter card physical address
   designating any one of the nodes in said sub-network to become a master node, wherein said master is adapted to interface with a user;
   identifying all nodes within said network to be included in said sub-network;
   broadcasting from said master node a request for node configuration information from all nodes in said network identified to be in said sub-network;
   receiving at said master node said node configuration information from said identified nodes and altering said configuration information of said nodes to eliminate any duplicate node numbers;
   generating a new network map within said master node;
   requesting a lock condition in all nodes within said sub-network against software applications affecting the building of said sub-network;
   waiting a predetermined amount of time for a reply from each said node in said sub-network, wherein a negative reply received from any node cancels the lock condition at each node and terminates the build process;
   sending said new sub-network map to all nodes in said sub-network wherein each node updates its network configuration, if a positive acknowledgement is received from all nodes in said sub-network;
   executing an unlock condition at all nodes in said sub-network after receipt of said new sub-network map and replying to said master node that said build process was successful;
   synchronizing with one another all nodes in said new sub-network.

9. The method of claim 8, wherein said step of synchronizing comprises the steps of:
   broadcasting from an activated node a NODE-UP message to all other nodes in said network, said NODE-UP message including a node number, a LAN-ID and LAN adapter card physical address;
   verifying at nodes within said sub-network, said LAN-ID, that said broadcasted node number is part of said new network map, and non-duplication of node number and adapter card physical address, wherein nodes with different LAN-IDs will disregard said NODE-UP message;
   responding from nodes in said sub-network to said activated node with a NODE-UP-RESPONSE message, said NODE-UP-RESPONSE message including a node number, a LAN-ID and LAN adapter card physical address;

updating the internal data structures of said nodes in said sub-network to include said activated node;

verifying said NODE-UP-RESPONSE message at said activated node to include said responding node in the internal data structure of said activated node.

10. The method of claim 8, wherein said nodes in said network are identified by said group name.

11. The method of claim 8, wherein each node in said network is assigned a specific node name, wherein said nodes in said sub-network are identified using said specific node name.

12. The method of claim 8, wherein said step of generating a new network map further includes the step of generating a new LAN-ID for said sub-network, said new LAN-ID comprising said LAN adapter card physical address combined with a time stamp.

13. The method of claim 8, further including the step of employing a time-out mechanism set for a predetermined amount of time in each of said nodes to thereby prevent indefinite lockout as a result of requesting said lock condition.

14. The method of claim 8, wherein said step of altering said configuration information of said nodes to eliminate any duplicate node numbers is carried out automatically via an automatic-build subroutine.

15. The method of claim 14, wherein said automatic-build subroutine includes the steps of:
retaining non-duplicate node numbers within said sub-network;
searching for a non-assigned node number from a predetermined starting point within said sub-network and assigning said non-assigned node numbers said duplicate node numbers;
re-assigning a required node number to the highest number of any non-required node numbers, if specific node numbers are required in said sub-network.

16. In a communications network architecture having multiple software layers of specific functionality and including at least a configuration utility layer, a node supervisor layer and a communication handler layer, a method for building a subnetwork of nodes within said communications network architecture, said method comprising the steps of:
providing a network of nodes, wherein each node in said network includes node configuration information, said node configuration information including at least at least a node number, a group name, a LAN-ID and a LAN adapter card having a unique physical address;
designating any one of the nodes in said sub-network to become a master node, wherein said master is adapted to interface with a user;
identifying via said user in said configuration layer all nodes within said network to be included in said sub-network;
broadcasting from said master node in said communication handler layer a request for node configuration information from all nodes in said network having an identical group name as those nodes identified by said user;
receiving at said master node said node configuration information from said identified nodes and altering said configuration information of said nodes to eliminate any duplicate node numbers;
generating a new network map within said node supervisor layer of said master node;
requesting a lock condition in said node supervisor layer of all nodes within said sub-network against software applications affecting the building of said sub-network;
waiting a predetermined amount of time for a reply from each said node in said sub-network, wherein a negative reply received from any node cancels the lock condition at each node and terminates the build process;
sending said new sub-network map on said node supervisor layer to all nodes in said sub-network wherein each node updates its network configuration, if a positive acknowledgement is received from all nodes in said sub-network;
executing an unlock condition at all nodes through said node supervisor layer in said sub-network after receipt of said new sub-network map and replying to said master node that said build process was successful;
synchronizing with one another all nodes in said new sub-network on said communication handler layer.

17. The method of claim 16, wherein said step of synchronizing comprises the steps of:
broadcasting from an activated node a NODE-UP message to all other nodes in said network, said NODE-UP message including a node number, a LAN-ID and LAN adapter card physical address;
verifying at nodes within said sub-network, said LAN-ID, that said broadcasted node number is part of said new network map, and non-duplication of node number and adapter card physical address, wherein nodes with different LAN-IDs will disregard said NODE-UP message;
responding from nodes in said sub-network to said activated node with a NODE-UP-RESPONSE message, said NODE-UP-RESPONSE message including a node number, a LAN-ID and LAN adapter card physical address;
updating the internal data structures of said nodes in said sub-network to include said activated node;
verifying said NODE-UP-RESPONSE message at said activated node to include said responding node in the internal data structure of said activated node.

18. The method of claim 16, wherein said step of generating a new network map further includes the step of generating a new LAN-ID at said configuration utility layer, said new LAN-ID comprising said LAN adapter card physical address combined with a time stamp.

19. The method of claim 16, wherein said step of altering said configuration information of said nodes to eliminate any duplicate node numbers is carried out automatically via an automatic-build subroutine, wherein said subroutine includes the steps of:
retaining non-duplicate node numbers within said sub-network;
searching for a non-assigned node number from a predetermined starting point within said sub-network and assigning said non-assigned node numbers said duplicate node numbers;
re-assigning a required node number to the highest number of any non-required node numbers, if specific node numbers are required in said sub-network.

20. The method of claim 16, wherein said user is provided interactive feedback regarding the status of said sub-network build process via said configuration utility layer.

* * * * *